US012643089B2

(12) United States Patent
Aoshima et al.

(10) Patent No.: US 12,643,089 B2
(45) Date of Patent: Jun. 2, 2026

(54) ADSORBENT PARTICLES, METHOD FOR PRODUCING ADSORBENT PARTICLES, BASE MATERIAL PARTICLES, FILLING COLUMN, AND METHOD FOR RECOVERING RARE EARTH ELEMENT

(71) Applicant: Resonac Corporation, Tokyo (JP)

(72) Inventors: Masahiro Aoshima, Tokyo (JP); Yohei Ishikawa, Tokyo (JP); Masato Miyatake, Tokyo (JP)

(*) Notice: Subject to any disclaimer, the term of this patent is extended or adjusted under 35 U.S.C. 154(b) by 396 days.

(21) Appl. No.: 18/251,245

(22) PCT Filed: Oct. 22, 2021

(86) PCT No.: PCT/JP2021/039082
§ 371 (c)(1),
(2) Date: May 1, 2023

(87) PCT Pub. No.: WO2022/102373
PCT Pub. Date: May 19, 2022

(65) Prior Publication Data

US 2023/0405553 A1 Dec. 21, 2023

(30) Foreign Application Priority Data

Nov. 11, 2020 (JP) ................................ 2020-188083

(51) Int. Cl.

| | |
|---|---|
| ***B01J 20/00*** | (2006.01) |
| ***B01J 20/26*** | (2006.01) |
| ***B01J 20/28*** | (2006.01) |
| ***B01J 20/285*** | (2006.01) |
| ***B01J 20/30*** | (2006.01) |

(52) U.S. Cl.
CPC ........... *B01J 20/285* (2013.01); *B01J 20/262* (2013.01); *B01J 20/28016* (2013.01); *B01J 20/30* (2013.01); *B01J 2220/58* (2013.01)

(58) Field of Classification Search
CPC .. B01J 20/285; B01J 20/262; B01J 20/28016; B01J 20/30; B01J 2220/58
USPC .......................................................... 502/402
See application file for complete search history.

(56) References Cited

U.S. PATENT DOCUMENTS

2016/0010178 A1* 1/2016 Ogata ....................... C22B 3/24
524/612

FOREIGN PATENT DOCUMENTS

| | | | | |
|---|---|---|---|---|
| CN | 85108961 | | 6/1986 | |
| CN | 102574102 | | 7/2012 | |
| CN | 105073245 | | 11/2015 | |
| CN | 105439893 | | 3/2016 | |
| JP | 2013-500291 | | 1/2013 | |
| JP | 2013500291 A | * | 1/2013 | ......... B01D 15/3804 |

(Continued)

OTHER PUBLICATIONS

International Preliminary Report on Patentability with Written Opinion dated May 25, 2023 for PCT/JP2021/039082.

(Continued)

*Primary Examiner* — James E McDonough
(74) *Attorney, Agent, or Firm* — SHIPWAY IP

(57) ABSTRACT

Adsorbent particles including: porous carrier particles containing an organic polymer; polyethylenimine attached to a surface of the porous carrier particles; and a diglycolic acid residue bonded to an amino group of the polyethylenimine. A most frequent pore size of the porous carrier particles exceeds 10 nm.

16 Claims, 1 Drawing Sheet

(56) References Cited

FOREIGN PATENT DOCUMENTS

| | | | |
|---|---|---|---|
| JP | 2016-053117 | | 4/2016 |
| JP | 6103611 | | 3/2017 |
| JP | 2019-141810 | | 8/2019 |
| JP | 2019141810 | A * | 8/2019 |
| JP | 2019-198801 | | 11/2019 |
| JP | 2021-109138 | | 8/2021 |
| JP | 2022-059290 | | 4/2022 |
| WO | 2014/157225 | | 10/2014 |
| WO | 2020/225964 | | 11/2020 |
| WO | 2020/251000 | | 12/2020 |

OTHER PUBLICATIONS

Takeshi Ogata, "Adsorption behavior of rare earth elements on silica gel modified with diglycol amic acid", lydrometallurgy, 2015 (152), p. 178-p. 182.

Tomohiro Shinozaki, "Preparation of Polymeric Adsorbents Bearing Diglycolamic Acid Ligands for Rare Earth Elements", Ind. Eng. Chem. Res., 2018 (57), p. 11424-p. 11430.

International Search Report dated Dec. 21, 2021 for PCT/JP2021/039082.

* cited by examiner

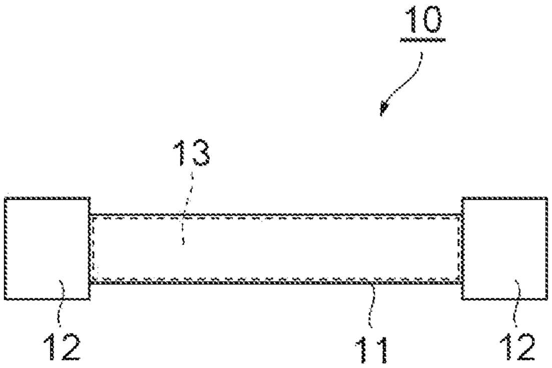
10
13
12
11
12

ADSORBENT PARTICLES, METHOD FOR PRODUCING ADSORBENT PARTICLES, BASE MATERIAL PARTICLES, FILLING COLUMN, AND METHOD FOR RECOVERING RARE EARTH ELEMENT

CROSS-REFERENCE TO RELATED APPLICATIONS

This application is a 35 U.S.C. § 371 national phase application of PCT/JP2021/039082, filed on Oct. 22, 2021, which claims priority to Japanese Patent Application No. 2020-188083, filed on Nov. 11, 2020.

TECHNICAL FIELD

The present disclosure relates to adsorbent particles, a method for producing adsorbent particles, base material particles, a filled column, and a method for recovering a rare earth element.

BACKGROUND ART

As an adsorbent selectively adsorbing and desorbing a rare earth element, those obtained by introducing diglycolic acid into a surface of various particles have been proposed (Patent Literature 1 and Non Patent Literatures 1 and 2).

CITATION LIST

Patent Literature

Patent Literature 1: Japanese Patent No. 6103611

Non Patent Literature

Non Patent Literature 1: Takeshi Ogata, Hydrometallurgy, 152 (2015) 178-182

Non Patent Literature 2: Tomohiro Shinozaki, Ind. Eng. Chem. Res., 57 (2018) 11424-11

SUMMARY OF INVENTION

Technical Problem

An aspect of the present disclosure relates to adsorbent particles having a large adsorption amount of a rare earth element.

Solution to Problem

An aspect of the present disclosure relates to adsorbent particles comprising: porous carrier particles comprising an organic polymer; polyethylenimine attached to a surface of the porous carrier particles; and a diglycolic acid residue bonded to an amino group of the polyethylenimine. A most frequent pore size of the porous carrier particles exceeds 10 nm.

Another aspect of the present disclosure relates to a method for producing adsorbent particles, the method including: preparing base material particles including porous carrier particles comprising an organic polymer and polyethylenimine attached to a surface of the porous carrier particles; and bonding diglycolic acid or an anhydride thereof to an amino group of the polyethylenimine to form adsorbent particles. A most frequent pore size of the porous carrier particles exceeds 10 nm.

Still another aspect of the present disclosure relates to base material particles comprising: porous carrier particles comprising an organic polymer; and polyethylenimine attached to a surface of the porous carrier particles. A most frequent pore size of the porous carrier particles exceeds 10 nm.

Still another aspect of the present disclosure relates to a filled column comprising: a column main body; and the above-described adsorbent particles filled in the column main body.

Still another aspect of the present disclosure relates to a method for recovering a rare earth element, the method including: bringing a solution containing a rare earth element into contact with the above-described adsorbent particles to adsorb the rare earth element on the adsorbent particles; and desorbing the rare earth element from the adsorbent particles by contact with an acidic solution containing an acid.

Advantageous Effects of Invention

An aspect of the present disclosure provides adsorbent particles having a large adsorption amount of a rare earth element.

BRIEF DESCRIPTION OF DRAWINGS

FIG. 1 is a schematic diagram illustrating an example of a filled column.

DESCRIPTION OF EMBODIMENTS

The present invention is not limited to the following examples.

Adsorbent particles according to the present disclosure includes: porous carrier particles containing an organic polymer; polyethylenimine attached to a surface of the porous carrier particles; and a diglycolic acid residue bonded to an amino group of the polyethylenimine.

The porous carrier particles are polymer particles containing an organic polymer as a main component. The organic polymer may be cross-linked. The ratio of the organic polymer in the porous carrier particles may be 50 to 100% by mass, 60 to 100% by mass, 70 to 100% by mass, 80 to 100% by mass, or 90 to 100% by mass, on the basis of the mass of the porous carrier particles.

The organic polymer can be a polymer including a cross-linkable monomer as a monomer unit. The cross-linkable monomer may be, for example, a divinyl compound such as divinylbenzene, divinylbiphenyl, divinylnaphthalene, and divinylphenanthrene. These cross-linkable monomers may be used singly or in combination of two or more kinds thereof. From the viewpoint of durability, acid resistance, and alkalinity, the cross-linkable monomer may be divinylbenzene, which is a styrene-based monomer. The ratio of the monomer unit derived from the cross-linkable monomer in the organic polymer may be 1 to 80% by mol, 1 to 60% by mol, or 1 to 40% by mol, with respect to the whole monomer units constituting the organic polymer.

The organic polymer may be a copolymer of a cross-linkable monomer and a monofunctional monomer. Examples of the monofunctional monomer include styrene-based monomers (styrene and styrene derivatives) such as styrene, o-methylstyrene, m-methylstyrene, p-methylstyrene, α-methylstyrene, o-ethylstyrene, m-ethylstyrene, p-ethylstyrene, 2,4-dimethylstyrene, p-n-butylstyrene, p-t-butylstyrene, p-n-hexylstyrene, p-n-octylstyrene, p-n-nonylstyrene, p-n-decylstyrene, p-n-dodecylstyrene, p-methoxystyrene, p-phenylstyrene, p-chlorostyrene, and 3,4-dichlorostyrene. These may be used singly or in combination of two or more kinds thereof. From the viewpoint of acid resistance and alkaline resistance, the monofunctional monomer may be styrene.

The organic polymer may include a monomer having a reactive group reacting with an amino group as a monomer unit. The organic polymer may be a copolymer including a cross-linkable monomer and a monomer having a reactive group as monomer units. The reactive group may be, for example, an epoxy group, a chloro group, or a combination thereof. Examples of the monomer having an epoxy group include glycidyl methacrylate. An example of the organic polymer including glycidyl methacrylate as a monomer unit is a divinylbenzene-glycidyl methacrylate copolymer. Examples of the monomer having a chloro group include 4-chloromethylstyrene. The ratio of the monomer unit (constitutional unit) derived from the monomer having a reactive group in the organic polymer may be 15 to 80% by mol, 15 to 65% by mol, 30 to 80% by mol, or 30 to 65% by mol, with respect to the whole monomer units constituting the organic polymer.

When the pore size of the porous carrier particles is small, the specific surface area increases, and in general, when the surface area of the porous carrier particles is large, it is expected that the adsorption amount of a rare earth element by the adsorbent particles increases. However, according to the findings of the present inventor, in a case where the pore size of the porous carrier particles is equal to or larger than a certain value, the adsorption amount of a rare earth element significantly increases. Specifically, when the most frequent pore size of the porous carrier particles exceeds 10 nm, the adsorbent particles can adsorb a rare earth element at a significantly large adsorption amount. The reason for this to be speculated is, for example, that when the pore size is large, pores are difficult to be clogged by polyethylenimine or the like. From the same viewpoint, the most frequent pore size of the porous carrier particles may be 11 nm or more, 12 nm or more, or 13 nm or more. The most frequent pore size of the porous carrier particles may be 100 nm or less, 95 nm or less, or 90 nm or less.

The most frequent pore size means a pore size having the highest frequency in pore size distribution as measured by a nitrogen gas adsorption method, and is also referred to as a mode diameter. The pore size distribution is measured, for example, by a BJH method using a nitrogen gas as an adsorbate. Frequencies in a pore size range of 1 to 200 nm in the pore size distribution are calculated, and the pore size showing the highest frequency among the frequencies can be regarded as the most frequent pore size.

When the specific surface area and/or the pore volume of the porous carrier particles is large, there is a tendency that the adsorption amount of a rare earth element by the adsorbent particles is further increased. From such a viewpoint, the specific surface area of the porous carrier particles may be 50 $m^2/g$ or more or 100 $m^2/g$ or more, and may be 1000 $m^2/g$ or less. The pore volume of the porous carrier particles may be 5.0 mL/g or more, 6.0 mL/g or more, 7.0 mL/g or more, 8.0 mL/g or more, or 9.0 ml/g or more, and may be 30 mL/g or less. The specific surface area and the pore volume can be values determined from pore distribution as measured by a nitrogen gas adsorption method.

The average particle size of the porous carrier particles may be 30 to 1000 μm or 50 to 500 μm. When the average particle size of the porous carrier particles is small, the pressure of a filled column filled with the adsorbent particles may increase. Here, the average particle size of porous carrier particles can be determined by the following measurement method.

1) Particles are dispersed in water (containing a dispersant such as a surfactant) to prepare a dispersion including 1% by mass of the particles.
2) The average particle size is measured from an image of about 10000 particles in the dispersion by using a flow-type particle image analyzer.

The polyethylenimine to be attached to the porous carrier particles is a polymer including a constitutional unit having an amino group. The polyethylenimine may be branched or linear, and may include three or more constitutional units derived from aziridine.

From the viewpoint of improving the adsorption amount of a rare earth element, the number average molecular weight of the polyethylenimine as measured by ebullioscopy may be 1500 or more, 3000 or more, 5000 or more, or 8000 or more. From the viewpoint of ease of attachment to the porous carrier particles, the number average molecular weight of the polyethylenimine as measured by ebullioscopy may be 100000 or less, 80000 or less, 50000 or less, or 20000 or less. The polyethylenimine may be selected on the basis of the number average molecular weight that is a converted value determined by gel permeation chromatography (GPC). In this case, the converted value of the number average molecular weight is determined on the basis of a calibration curve prepared using maltotriose, maltoheptaose, and pullulan (number average molecular weight: 5800, 12200, 23700, 48000, 100000, 186000, 380000, and 853000) as standard substances. The gel permeation chromatography is performed, for example, under the condition using a 0.2 M monoethanolamine aqueous solution (pH adjusted to 5.1 with acetic acid) as an eluent and a differential refraction detector. The number average molecular weight of the polyethylenimine as measured by such a GPC method may be 3500 or more, 7000 or more, or 10000 or more, and may be 30000 or less, 20000 or less, or 15000 or less.

From the viewpoint of improving the adsorption amount of a rare earth element, the viscosity of the polyethylenimine at 25° C. may be 8000 mPa·s or more or 20000 mPa·s or more. From the viewpoint of ease of attachment to the porous carrier particles, the viscosity of the polyethylenimine at 25° C. may be 1000000 mPa·s or less, 500000 mPa·s or less, or 300000 mPa·s or less. The viscosity described herein can be a value as measured by a rotational type viscometer (for example, E-type viscometer).

At least a part of the polyethylenimine attached to a surface of the porous carrier particles may be bonded to the organic polymer by covalent bonding. For example, in a case where the organic polymer has a reactive group, by the reaction between the reactive group and the amino group, the polyethylenimine can be bonded to the organic polymer by covalent bonding.

The ratio of the amount of the polyethylenimine with respect to the mass of the porous carrier particles may be, for example, 5 to 80% by weight, 10 to 80% by weight, 5 to 70% by weight, or 10 to 70% by weight. The amount of the amino group in the adsorbent particles per 1 g of the adsorbent particles may be 0.1 to 100 mmol, 0.1 to 50 mmol, 0.5 to 100 mmol, or 0.5 to 20 mmol.

The amount of the amino group in the adsorbent particles or base material particles described below can be determined by a method in which the amount of sulfuric acid consumed by reaction with the amino group is measured by titration using sodium hydroxide. The method of measuring the amount of the amino group in the base material particles includes the following operations.

1) Methanol is added to (A) g of base material particles to obtain a dispersion, and the obtained dispersion is heated at 75° C. for 30 minutes.
2) The base material particles are recovered from the dispersion onto a filter by suction filtration. While continuing suction, pure water is added to the base material particles on the filter to substitute methanol by pure water, and then the base material particles are subjected to conditioning using a small amount of a 0.1 M sodium hydroxide aqueous solution. Thereafter, the base material particles are washed with pure water until the filtrate becomes neutral.
3) The base material particles obtained after washing are transferred to a container made of glass using a small amount of pure water. The total amount of the pure water in the container is adjusted to (B) g.
4) (C) g of 0.05 M sulfuric acid is added to the dispersion in the container, and then the dispersion in the container is stirred at room temperature for 30 minutes at 150 rpm.
5) (D) g of the supernatant of the dispersion is fractionated, and pure water is added thereto so as to adjust the liquid amount.
6) The supernatant obtained after diluting is titrated using a 0.01 M sodium hydroxide aqueous solution, and the amount (E) mL of the sodium hydroxide aqueous solution required for neutralization is recorded.
7) The amount of the amino group is calculated by the following formula.

$$\text{Amount(mmol/g) of amino group}=[\{0.1\times C\times D/(B+C)-0.01\times E\}\times(B+C)/D]/A$$

The diglycolic acid residue is, for example, a monovalent group bonded to the amino group of the polyethylenimine, as represented by Formula (21) or (22) below. The amino group in the formula is the amino group of the polyethylenimine, and the moiety excluding the amino group is the diglycolic acid residue. The diglycolic acid residue interacts with a rare earth complex so that the adsorbent particles can adsorb a rare earth element.

(21)

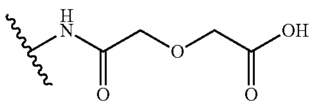

(22)

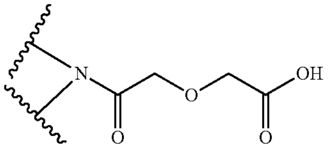

The adsorbent particles can be produced, for example, by a method including preparing base material particles including porous carrier particles and polyethylenimine attached to a surface of the porous carrier particles and having no diglycolic acid residue, and bonding diglycolic acid or an anhydride thereof to an amino group of the polyethylenimine to form adsorbent particles.

The base material particles are produced by attaching polyethylenimine to a surface of the porous carrier particles. An example of the method of preparing base material particles in a case where porous carrier particles contain an organic polymer having a reactive group includes generating porous carrier particles by suspension polymerization in a reaction solution containing a monomer component including a monomer having a reactive group, a pore-forming agent, and an aqueous medium, and bonding the polyethylenimine to the organic polymer by a reaction between the reactive group and the polyethylenimine.

The most frequent pore size, the specific surface area, and the pore volume of the porous carrier particles can be controlled on the basis of the amount of the pore-forming agent used for forming porous carrier particles. When the amount of the pore-forming agent is relatively small, there are tendencies that the most frequent pore size increases and the specific surface area and the pore volume decrease. For example, by adjusting the amount of the pore-forming agent in a range of 50 to 300% by mass with respect to the total amount of the monomer components, porous carrier particles having a most frequent pore size exceeding 10 μm can be particularly easily obtained.

The pore-forming agent is a component that promotes phase separation of particles during polymerization to thereby form porous polymer particles. An example of the pore-forming agent is an organic solvent. Also when the ratio of a hydrophobic component in the pore-forming agent is small, there is a tendency that a larger most frequent pore size is obtained. Examples of hydrophobic pore-forming agents include aliphatic or aromatic hydrocarbons. Examples of the aliphatic or aromatic hydrocarbons used as pore-forming agents include toluene, xylene, diethylbenzene, cyclohexane, and octane. The pore-forming agent may contain a hydrophilic component having a hydrophilic group. Examples of the hydrophilic group include an alcoholic hydroxyl group, a carboxylic acid ester group, a ketone group, and an ether group. For example, in a case where the monomer component includes a monomer having an epoxy group, when the ratio of the hydrophilic component having an alcoholic hydroxyl group in the pore-forming agent is large, there is a tendency that porous carrier particles having a larger most frequent pore size are easily formed. Examples of the hydrophilic component used as a pore-forming agent include butyl acetate, dibutyl phthalate, methyl ethyl ketone, dibutyl ether, 1-hexanol, 1-octanol, 2-octanol, decanol, lauryl alcohol, and cyclohexanol. In order to more easily produce porous carrier particles having an appropriate pore size distribution, the pore-forming agent may contain, for example, at least one hydrophobic component selected from the group consisting of toluene, xylene, diethylbenzene, cyclohexane, and octane, and at least one hydrophilic component selected from the group consisting of butyl acetate, dibutyl phthalate, methyl ethyl ketone, dibutyl ether, 1-hexanol, 1-octanol, 2-octanol, decanol, lauryl alcohol, and cyclohexanol. In a case where the hydrophobic component and the hydrophilic component are used in combination, the ratio of the hydrophobic component may be 30 to 95% by mass on the basis of the total amount of the pore-forming agent.

The aqueous medium may include water. This water may function as a pore-forming agent. For example, when an oil-soluble surfactant is added to the reaction solution, particles containing the monomer and the oil-soluble surfactant are formed, and phase separation in the particles can be promoted by the particles absorbing water. The particles are made porous by removing one of the phases from the phase-separated particles.

The aqueous medium includes water or a mixed solvent of water and a water-soluble solvent (for example, lower alcohol). The aqueous medium may include a surfactant. The surfactant may be an anionic, cationic, non-ionic, or amphoteric surfactant.

The reaction solution for suspension polymerization may contain a polymerization initiator. Examples of the polymerization initiator include organic peroxides such as benzoyl peroxide, lauroyl peroxide, benzoyl orthochloroperoxide, benzoyl orthomethoxyperoxide, 3,5,5-trimethylhexanoyl peroxide, tert-butyl peroxy-2-ethylhexanoate, and di-tert-butyl peroxide; and azo-based compounds such as 2,2'-azobisisobutyronitrile, 1,1'-azobiscyclohexanecarbonitrile, and 2,2'-azobis(2,4-dimethylvaleronitrile). The amount of the polymerization initiator may be 0.1 to 7.0 parts by mass with respect to 100 parts by mass of the monomer components.

In order to improve dispersion stability of particles containing monomer components, the reaction solution may contain a dispersion stabilizer. Examples of the dispersion stabilizer include polyvinyl alcohol, polycarboxylic acid, celluloses (such as hydroxyethyl cellulose, carboxymethyl cellulose, and methyl cellulose), and polyvinylpyrrolidone. Inorganic water-soluble macromolecular compounds such as sodium tripolyphosphate may be used in combination with these dispersion stabilizers. The dispersion stabilizer may be polyvinyl alcohol or polyvinylpyrrolidone. The amount of the dispersion stabilizer may be 1 to 10 parts by mass with respect to 100 parts by mass of the monomers.

The reaction solution for suspension polymerization may contain water-soluble polymerization inhibitors such as nitrous acid salts, sulfurous acid salts, hydroquinones, ascorbic acids, water-soluble vitamins B, citric acid, and polyphenols.

The polymerization temperature for suspension polymerization can be appropriately selected according to the types of the monomer and the polymerization initiator. The polymerization temperature may be 25 to 110° C. or 50 to 100° C.

The generated porous carrier particles are washed and dried as necessary, and then the amino group of the polyethylenimine is reacted with the reactive group of the organic polymer. This reaction can be performed, for example, in a reaction solution containing porous carrier particles, polyethylenimine, and a solvent while heating as necessary. The solvent is not particularly limited, and may be, for example, water.

The base material particles are washed and dried as necessary, and then diglycolic acid or an anhydride thereof is bonded to the amino group of the polyethylenimine attached to the porous carrier particles. This reaction can be performed, for example, in a reaction solution containing base material particles, diglycolic acid or an anhydride thereof, and a solvent while heating as necessary. The solvent is not particularly limited, and may be, for example, tetrahydrofuran. By this reaction, adsorbent particles into which the diglycolic acid residue is introduced are formed. The formed adsorbent particles are washed and dried as necessary.

The base material particles including porous carrier particles and polyethylenimine attached to a surface of the porous carrier particles may be used for obtaining adsorbent particles or separation material particles into which a ligand other than the diglycolic acid residue is introduced. The average particle size of the base material particles is, usually, substantially the same as the average particle size of the adsorbent particles.

A rare earth element can be efficiently recovered by a method including bringing a solution containing a rare earth element into contact with the adsorbent particles to adsorb the rare earth element on the adsorbent particles, and desorbing the rare earth element from the adsorbent particles in an acidic solution containing an acid.

The temperature of each of the solution for adsorbing and the acidic solution for desorbing is not particularly limited, and may be, for example, 15 to 35° C. The time for contact between the solution for adsorbing and the adsorbent particles may be, for example, 20 seconds or longer or 40 seconds or longer, and may be 48 hours or shorter. The time for contact between the acidic solution for desorbing and the adsorbent particles may be, for example, 5 seconds or longer or 10 seconds or longer, and may be 6 hours or shorter.

A recovering method using the adsorbent particles according to the present disclosure enables a rare earth element to be efficiently recovered on the basis of a large adsorption amount by the adsorbent particles and efficient desorbing of the adsorbed rare earth element. The adsorbent particles according to the present disclosure are also advantageous in that deterioration when the adsorbent particles are repeatedly used is small since resistance to an acid is high, as compared with an adsorbent containing silica particles as porous carrier particles.

The pH of the solution when the rare earth element is adsorbed on the adsorbent particles may be about 1.0 to 2.0. The degree of acidity of the acidic solution for desorbing the rare earth element is adjusted to such a strength that the rare earth element is appropriately desorbed. For example, the acid concentration of the acidic solution may be 2 normality (2 gram-equivalent/L) or less, 1 normality or less (1 gram-equivalent/L), or 0.5 normality or less (0.5 gram-equivalent/L). The adsorbent particles according to the present disclosure can desorb a rare earth element at high efficiency even in the case of using an acidic solution having a relatively mild acidity. Use of an acidic solution having mild acidity is also advantageous in terms of a decrease in environmental load as well as suppression of deterioration of an adsorbent. The acidic solution may be, for example, hydrochloric acid.

A rare earth element to be recovered may be any of scandium, yttrium, and lanthanoid, and may be lanthanoid such as dysprosium and neodymium. A solution in which a rare earth element to be recovered is contained may be an aqueous solution. The rare earth element in the solution is, usually, dissolved as a cation in a solvent (for example, water).

The adsorbent particles may be used as a column filler. FIG. 1 is a schematic diagram illustrating an embodiment of a filled column. A filled column 10 illustrated in FIG. 1 includes a tubular column main body 11, connection portions 12, and a column filler 13 including the adsorbent particles of the aforementioned example. The connection portions 12 are disposed on both ends of the column main body 11 in order to connect the column main body 11 to a column chromatography apparatus. The column filler 13 is filled in the tubular column main body 11. The materials for the column main body 11 and the connection portions 12 are not particularly limited, may be stainless steel, and may be a resin such as polyether ether ketone (PEEK).

The column filler 13 including the adsorbent particles is usually filled in the column main body 11 together with a solvent. The solvent is not particularly limited as long as it is a solvent in which the adsorbent particles are dispersed, and may be, for example, water.

In a case where a rare earth element is recovered using the filled column, for example, a solution containing a rare earth element is caused to pass through the filled column, and subsequently an acidic solution is caused to pass through the filled column.

EXAMPLES

The present invention is not limited to the following Examples.

1. Porous Carrier Particles

In a 500 mL three-necked flask, 12.6 g of divinylbenzene having a purity of 57% (manufactured by Nippon Steel Corporation, trade name: DVB570), 8.4 g of glycidyl methacrylate, a pore-forming agent (15.75 g of decanol and 15.75 g of diethylbenzene), 0.21 g of benzoyl peroxide, 369 g of a polyvinyl alcohol aqueous solution (concentration: 0.5% by mass), and 30 g of a calcium phosphate dispersion (concentration: 10% by mass) were placed. The mixed liquid formed in the three-necked flask was stirred for about 8 hours while heated in a water bath at 80° C. to cause polymerization to proceed. Particles containing a divinylbenzene-glycidyl methacrylate copolymer generated by the polymerization were collected by filtration, and washed with hydrochloric acid and acetone in this order, thereby obtaining porous carrier particles. The obtained porous carrier particles were classified using a sieve to collect porous carrier particles 5 of fractions having a particle size of 300 to 500 μm (average particle size: about 400 μm). The most frequent pore size, the specific surface area, and the pore volume of the obtained porous carrier particles 5 were measured by a nitrogen gas adsorption method using a fully automatic gas adsorption amount measurement apparatus (Autosorb-iQ, manufactured by Quantachrome Instruments).

Porous carrier particles 1 to 4 and 6 to 15 each having different pore distribution were produced by the same method as described above, except that the total amount of the pore-forming agent and the ratio of diethylbenzene, which is a hydrophobic component in the pore-forming agent, were changed.

2. Production of Adsorbent Particles 2-1. Base Material Particles

Examples 1 to 10

The porous carrier particles 5 were added to methanol, and the porous carrier particles were wetted with methanol by rocking agitation of the suspension liquid. Thereafter, the suspension liquid was filtered while the wet state was maintained using pure water so as to substitute methanol with pure water. Polyethylenimine (EPOMIN SP-200 (trade name), number average molecular weight by ebullioscopy: 10000, viscosity: 40000 to 150000 mPa·s/25° C.) was added in an amount corresponding to the mass ratio of water: polyethylenimine of 1:2 to the suspension liquid containing pure water and the wetted porous carrier particles. Subsequently, the reaction between the epoxy group of the porous carrier particles and the polyethylenimine was caused to proceed by heating the suspension liquid at 80° C. for 8 hours. The porous carrier particles collected by filtration were sufficiently washed with ethanol and water and then dried at 80° C. for 15 hours, thereby obtaining base material particles of Example 5 into which the polyethylenimine was introduced.

Base material particles of Examples 1 to 4 and 6 to 10 were obtained by the same procedures as in the production of the base material particles of Example 5, except that the porous carrier particles 5 were changed to the porous carrier particles 1, 2, 3, 4, 6, 7, 8, 9, or 10. However, only in the case of the porous carrier particles 7 used in Example 7, porous carrier particles of fractions having a particle size of 150 to 300 μm (average particle size: about 225 μm) were collected by classification, and the porous carrier particles were used in the production of base material particles.

Comparative Examples 1 to 4

Base material particles of Comparative Examples 1 to 4 were obtained by the same procedures as in the production of the base material particles of Example 5, except that the porous carrier particles 5 were changed to the porous carrier particles 11, 12, 13, or 14.

Examples 11 and 12

Base material particles of Examples 11 and 12 were obtained in the same manner as in the production of the base material particles of Example 5, except that the porous carrier particles 3 or 10 were used, and the polyethylenimine was changed to EPOMIN SP-018 (trade name, number average molecular weight by ebullioscopy: 1800, viscosity: 8500 to 15000 mPa·s/25° C.).

Comparative Example 5

Base material particles of Comparative Example 5 were obtained in the same manner as in the production of the base material particles of Example 5, except that the porous carrier particles 13 were used, and the polyethylenimine was changed to EPOMIN SP-018 (trade name, number average molecular weight by ebullioscopy: 1800, viscosity: 8500 to 15000 mPa·s/25° C.).

Example 13

Base material particles of Example 13 were obtained in the same manner as in the production of the base material particles of Example 5, except that the porous carrier particles 5 were used, and the polyethylenimine was changed to EPOMIN HM-2000 (trade name, number average molecular weight by ebullioscopy: 30000, viscosity: 5000 to 15000 mPa·s/25° C. (aqueous solution having a concentration of 50%)).

Example 14

Fractions having a particle size of 150 to 300 μm (average particle size: about 225 μm) were collected by classification of the porous carrier particles 5. Base material particles of Example 14 were obtained in the same manner as in the production of the base material particles of Example 5, except that the porous carrier particles 5 of the collected fractions were used, and the polyethylenimine was changed to EPOMIN HM-2000 (trade name, number average molecular weight by ebullioscopy: 30000, viscosity: 5000 to 15000 mPa·s/25° C. (aqueous solution having a concentration of 50%)).

Evaluation of Base Material Particles

The average particle size of each of the base material particles and the amount of the amino group per 1 g of each of the base material particles were measured.

2-2. Adsorbent Particles 1 g of each of the base material particles and 2 g of diglycolic anhydride were reacted in tetrahydrofuran at 50° C. for 8 hours. The particles collected by filtration were sufficiently washed with ethanol and water and then dried at 80° C. for 15 hours, thereby obtaining adsorbent particles of Examples and Comparative Examples into which the diglycolic acid residue was introduced.

3. Adsorption Test 20 mL of an aqueous solution for an adsorption test containing dysprosium (Dy) at a concentration of 160 ppm and having a pH adjusted to 1.5 was prepared. 50 mg of each of the adsorbent particles was added to this aqueous solution. The suspension liquid containing the adsorbent particles was shaken while the temperature thereof was maintained at 25° C. After dysprosium ions were adsorbed on the adsorbent particles by shaking for 24 hours, the dysprosium ion concentration in the aqueous solution was measured using an ICP emission analyzer of the aqueous solution collected from the suspension liquid. The adsorption amount (μmol/g) of the dysprosium ions per 1 g of the adsorbent particles was calculated from a difference in ion concentration before and after adsorption.

TABLE 1

| | Porous carrier particles | | | | Adsorbent particles | | |
|---|---|---|---|---|---|---|---|
| | | Most frequent pore size (nm) | Specific surface area ($m^2$/g) | Pore volume (mL/g) | Polyethylenimine Mn | Amine value (mmol/g) | Dy adsorption amount (μmol/g) |
| Ex. 1 | 1 | 86.2 | 175 | 6.0 | 10000 | 3.64 | 186 |
| Ex. 2 | 2 | 85.3 | 293 | 11.9 | 10000 | 5.29 | 194 |
| Ex. 3 | 3 | 60.6 | 376 | 14.5 | 10000 | 6.06 | 249 |
| Ex. 4 | 4 | 46.9 | 321 | 12.5 | 10000 | 5.57 | 221 |
| Ex. 5 | 5 | 46.6 | 314 | 12.2 | 10000 | 5.53 | 217 |
| Ex. 6 | 6 | 38.0 | 397 | 14.4 | 10000 | 5.42 | 237 |
| Ex. 7 | 7 | 24.6 | 401 | 14.6 | 10000 | 5.52 | 255 |
| Ex. 8 | 8 | 24.5 | 623 | 23.9 | 10000 | 5.91 | 259 |
| Ex. 9 | 9 | 18.9 | 353 | 13.1 | 10000 | 6.19 | 251 |
| Ex. 10 | 10 | 13.1 | 267 | 9.5 | 10000 | 5.95 | 257 |
| Ex. 11 | 3 | 60.6 | 376 | 14.5 | 1800 | 4.30 | 203 |
| Ex. 12 | 10 | 13.1 | 267 | 9.5 | 1800 | 5.3 | 268 |
| Ex. 13 | 5 | 46.6 | 314 | 12.2 | 30000 | 5.4 | 267 |
| Ex. 14 | 5 | 46.6 | 314 | 12.2 | 30000 | 5.4 | 275 |
| Comp. Ex. 1 | 11 | 10.0 | 265 | 9.8 | 10000 | 3.50 | 17 |
| Comp. Ex. 2 | 12 | 3.9 | 188 | 6.6 | 10000 | 2.23 | 7 |
| Comp. Ex. 3 | 13 | 3.7 | 296 | 10.0 | 10000 | 5.51 | 34 |
| Comp. Ex. 4 | 14 | 3.7 | 93 | 3.4 | 10000 | 2.03 | 7 |
| Comp. Ex. 5 | 13 | 3.7 | 296 | 10.0 | 1800 | 3.3 | 51 |

As shown in Table 1, it was confirmed that the adsorbent particles of Examples including porous carrier particles having a most frequent pore size exceeding 10 nm can adsorb a rare earth element at a significantly high adsorption amount.

REFERENCE SIGNS LIST

10: filled column, 11: column main body, 12: connection portion, 13: column filler.

The invention claimed is:

1. Adsorbent particles comprising:
- porous carrier particles comprising an organic polymer;
- polyethylenimine attached to a surface of the porous carrier particles; and
- a diglycolic acid residue bonded to an amino group of the polyethylenimine,
- wherein a most frequent pore size of the porous carrier particles exceeds 10 nm,
- a pore volume of the porous carrier particles is 5.0 mL/g to 30 mL/g, and
- an amount of an amino group in the adsorbent particles is 0.1 to 100 mmol per 1 g of the adsorbent particles.

2. The adsorbent particles according to claim 1, wherein a number average molecular weight of the polyethylenimine as measured by ebullioscopy is 1500 or more.

3. The adsorbent particles according to claim 1, wherein a viscosity of the polyethylenimine is 8000 mPa·s or more.

4. The adsorbent particles according to claim 1, wherein the organic polymer is a polymer comprising a monomer unit derived from a styrene-based monomer.

5. A method for producing adsorbent particles, the method comprising:
- preparing base material particles comprising porous carrier particles containing an organic polymer and polyethylenimine attached to a surface of the porous carrier particles; and
- bonding diglycolic acid or an anhydride thereof to an amino group of the polyethylenimine to form adsorbent particles,
- wherein a most frequent pore size of the porous carrier particles exceeds 10 nm,
- a pore volume of the porous carrier particles is 5.0 mL/g to 30 mL/g, and
- an amount of an amino group in the adsorbent particles is 0.1 to 100 mmol per 1 g of the adsorbent particles.

6. The method according to claim 5,
- wherein the organic polymer comprises a constitutional unit having a reactive group, and
- the base material particles are prepared by bonding the polyethylenimine to the organic polymer by a reaction between the reactive group and the polyethylenimine.

7. Base material particles comprising:
- porous carrier particles containing an organic polymer; and
- polyethylenimine attached to a surface of the porous carrier particles,
- wherein a most frequent pore size of the porous carrier particles exceeds 10 nm,
- a pore volume of the porous carrier particles is 5.0 mL/g to 30 mL/g, and
- an amount of an amino group in the base material particles is 0.1 to 100 mmol per 1 g of the base material particles.

8. The base material particles according to claim 7, wherein a number average molecular weight of the polyethylenimine as measured by ebullioscopy is 1500 or more.

9. The base material particles according to claim 7, wherein a viscosity of the polyethylenimine is 8000 mPa·s or more.

10. The base material particles according to claim 7, wherein the organic polymer is a polymer including a monomer unit derived from a styrene-based monomer.

11. The base material particles according to claim 7, wherein the base material particles are used for forming adsorbent particles comprising a diglycolic acid residue bonded to an amino group of the polyethylenimine.

12. A filled column comprising: a column main body; and the adsorbent particles according to claim 1 filled in the column main body.

13. A method for recovering a rare earth element, the method comprising:
- bringing a solution containing a rare earth element into contact with the adsorbent particles according to claim 1 to adsorb the rare earth element on the adsorbent particles; and
- desorbing the rare earth element from the adsorbent particles by contact with an acidic solution containing an acid.

14. The adsorbent particles according to claim 1, wherein the most frequent pore size of the porous carrier particles is 12 nm to 100 nm.

15. The method according to claim 5, wherein the most frequent pore size of the porous carrier particles is 12 nm to 100 nm.

16. The base material particles according to claim 7, wherein the most frequent pore size of the porous carrier particles is 12 nm to 100 nm.

* * * * *